US011475078B2

(12) United States Patent
Bastian et al.

(10) Patent No.: US 11,475,078 B2
(45) Date of Patent: Oct. 18, 2022

(54) ENDPOINT IDENTIFIER FOR APPLICATION PROGRAMMING INTERFACES AND WEB SERVICES

(71) Applicant: Clearwater Analytics, LLC, Boise, ID (US)

(72) Inventors: Mark Stanley Bastian, Eagle, ID (US); Dana Jo Salk, Meridian, ID (US)

(73) Assignee: Clearwater Analytics, LLC, Boise, ID (US)

( * ) Notice: Subject to any disclaimer, the term of this patent is extended or adjusted under 35 U.S.C. 154(b) by 0 days.

(21) Appl. No.: 17/096,770

(22) Filed: Nov. 12, 2020

(65) Prior Publication Data

US 2022/0121714 A1    Apr. 21, 2022

Related U.S. Application Data

(60) Provisional application No. 63/093,706, filed on Oct. 19, 2020.

(51) Int. Cl.

| *G06F 7/02* | (2006.01) |
|---|---|
| *G06F 16/00* | (2019.01) |
| *G06F 16/951* | (2019.01) |
| *G06F 9/54* | (2006.01) |
| *G06F 16/9538* | (2019.01) |

(52) U.S. Cl.
CPC ............ *G06F 16/951* (2019.01); *G06F 9/547* (2013.01); *G06F 16/9538* (2019.01)

(58) Field of Classification Search
CPC .... G06F 16/951; G06F 16/9538; G06F 9/547; G06F 8/20; G06F 8/74; G06F 11/006; G06F 2201/865
See application file for complete search history.

(56) References Cited

U.S. PATENT DOCUMENTS

| 10,509,858 | B1 * | 12/2019 | Smith Devine | ........... G06F 8/20 |
|---|---|---|---|---|
| 10,754,628 | B2 | 8/2020 | Hernan et al. | |
| 2009/0292797 | A1 * | 11/2009 | Cromp | ................... G06Q 10/10 709/223 |
| 2012/0221997 | A1 * | 8/2012 | Adams | .................. G06F 16/955 717/100 |
| 2017/0230478 | A1 * | 8/2017 | Huang | ............... G06Q 30/0273 |
| 2019/0034541 | A1 * | 1/2019 | Bosarge | ................ G06F 16/316 |
| 2019/0102239 | A1 | 4/2019 | Caldato et al. | |
| 2020/0186424 | A1 * | 6/2020 | Hashimoto | ............. G06F 9/453 |

FOREIGN PATENT DOCUMENTS

CN    111752536 A  * 10/2020

OTHER PUBLICATIONS

Semenov et al., "A Repository for multirelational dynamic networks," *IEEE/ACM International Conference on Advances in Social Networks Analysis and Mining*, Istanbul, Turkey, Aug. 26-29, 2012, pp. 1002-1005.

(Continued)

*Primary Examiner* — Bruce M Moser
(74) *Attorney, Agent, or Firm* — Seed IP Law Group, LLP

(57) ABSTRACT

A facility for identifying endpoints in an environment which crawls the environment to identify landing pages. The facility identifies endpoints within the landing pages and stores an indication of the environment containing the endpoint as well as an indication of the endpoint itself.

24 Claims, 8 Drawing Sheets

(56) References Cited

OTHER PUBLICATIONS

Rancher Labs, "Rancher 1.6 Docs," URL=https://rancher.com/docs/rancher/v1.6/en/, download date Mar. 3, 2022. (3 pages).
Patni, Sanjay, *Pro RESTful APIs: Design, Build and Integrate with REST, JSON, XML and JAX-RS*, Apress, Santa Clara, California, 2017, pp. 8-80, 103-106,.
International Search Report and Written Opinion, dated Feb. 9, 2022, for International Application No. PCT/US2021/055523, 11 pages.

* cited by examiner

FIG. 4

| Endpoint ID | Description | Environment | Project | Landing Page URL | Variables | REST Methods | Code to Invoke |
|---|---|---|---|---|---|---|---|
| 1111 | Returns security summary | production | issue-store | http://prod-las... | securityID; | Get | requests.get ('http://prod-las.... |
| 2222 | Associate an issue with a security | dev-shared | issue-store | http://dev-shared... | issueID; securityID | put | Requests.put('http:// dev... |
| ... | ... | ... | ... | ... | ... | ... | ... |
| 510 | 511 | 512 | 513 | 514 | 515 | 516 | 517 |

{ 501 (row 1), 502 (row 2) }

/advanced_api/super_query — 701

Parameters

| Parameter | Value | Description | Parameter Type | Data Type |
|---|---|---|---|---|
| environment | production | | query | string |
| projects | issue-store | 703 | query | Array[string] |
| param-names | securityId | 705 | query | Array[string] |
| get? | true | | query | boolean |
| post? | true | | query | boolean |
| put? | true | | query | boolean |

Try it out — 713

707 — get?
709 — post?
711 — put?

| | |
|---|---|
| Curl | curl -x GET --header 'Accept: application/json' 'http://dat-bighorn:8090/advanced_api/... |
| Request URL | http://dat-bighorn:8090/advanced_api/super_query?environment=production&projects=issue-store... |
| Response Body | [<br>{<br>  "description": "Stores system issues for CS",<br>  "request": {   ⎱ 801<br>    "db/id": 28794,<br>    "as": "auto",<br>    "method": "get",<br>    "query-params": {<br>      "beginDate": "${beginDate}",<br>      "endDate": "${endDate}"<br>    }<br>  },<br>  "url": "http://prod-las-service-issuestore-app5:8084/api/v1/securities/${securityId}/blockee/${blockee}",  ⎱ 803<br>  "python-template": "requests.get('http://prod-las-service-issuestore-app5:8084/api/v1/securities/${securityId}/blockee/${blockee}',\nparams={'beginDate':'${beginDate}','endDate':'${endDate}'})",<br>  "api-endpoint": "http://prod-las-service-issuestore-app5:8084/issue-store/api/openapi.json",  ⎱ 805<br>  "param-names": [<br>    "beginDate",<br>    "blockee",<br>    "endDate",<br>    "securityId"<br>  ],<br>  "summary": "Returns the ids of the issues blocking the given blockee",  ⎱ 807<br>  "host": "prod-las-service-issuestore-app5",<br>  "landing-page": "http://prod-las-service-issuestore-app5:8084/issue-store/",<br>  "project": "issue-store",<br>  "db/id": 28793,<br>  "api-type": "openapi",<br>  "environment": "production"<br>},|

FIG. 8

ENDPOINT IDENTIFIER FOR APPLICATION PROGRAMMING INTERFACES AND WEB SERVICES

CROSS-REFERENCE TO RELATED APPLICATIONS

This Application claims the benefit of U.S. Provisional Patent Application No. 63/093,706, filed Oct. 19, 2020, and entitled "ENDPOINT IDENTIFIER FOR APPLICATION PROGRAMMING INTERFACES AND WEB SERVICES," which is hereby incorporated by reference in its entirety.

In cases where the present application conflicts with a document incorporated by reference, the present application controls.

BACKGROUND

When developing applications, developers often utilize application programming interfaces (APIs). Developers of websites often employ web services to allow interaction with the data accessible to a website. In the context of web services, APIs often follow certain standards, such as REST, SOAP, etc. These web services allow both developers and users to interact with websites and with the data accessible to a servers, including those hosting the website.

BRIEF DESCRIPTION OF THE DRAWINGS

FIG. 4 is a display diagram showing an endpoint details screen presented by the facility in some embodiments.

FIG. 5 is a table diagram representing an endpoint data structure used by the facility in some embodiments.

FIG. 7 is a display diagram showing a sample query interface used by the facility in some embodiments.

FIG. 8 is a display diagram showing sample search query output produced by the facility in some embodiments.

DETAILED DESCRIPTION

Figure 1:
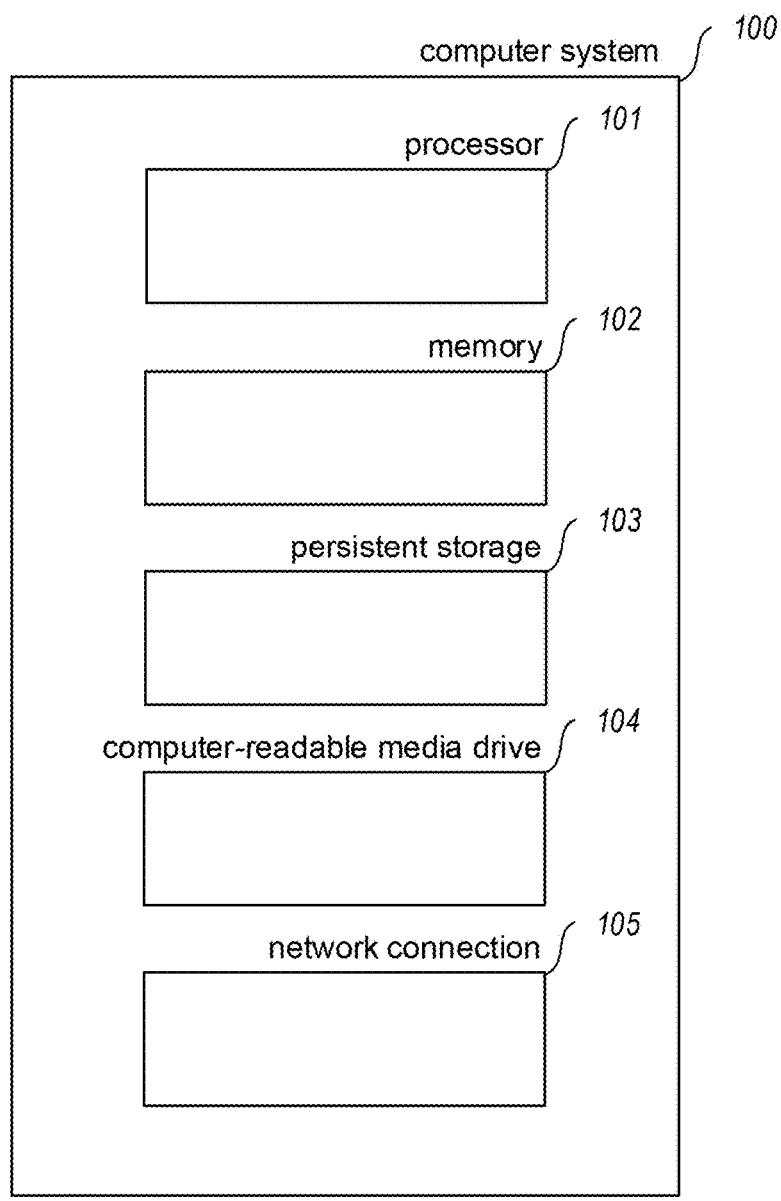
FIG. 1 is a block diagram showing some of the components typically incorporated in at least some of the computer systems and other devices on which the facility operates.

The inventors have recognized that it would be of great benefit to assist developers, website users, etc., (collectively "users") to learn of API functions, and determine what data is required to access and use them, especially those accessible through web services. The inventors have also determined that it would be beneficial to automate the process of finding web services, and the data required to use them, in different environments and projects.

The inventors have recognized a variety of disadvantages in current methods of identifying web services and the data required to use them. For example, even when code is documented, a multitude of coding environments and projects create a large number of "endpoints" (pages where a web service or API function is available for use), which can take an extraordinary amount of time to manually identify. This means it is easy for developers to overlook APIs that are already implemented, and subsequently waste time implementing them again. Developers create unnecessary redundancy when functionality is duplicated, which may cause excessive use of computing resources, such as data storage and processing power.

Users also may not have the ability to create their own functionality and must search for an appropriate endpoint manually. Furthermore, certain endpoints may be difficult to find due to unconventional naming conventions, whose interpretation may require knowledge of the inner workings of an organization, including unwritten information known to the few individuals who created the API.

In response to recognizing these disadvantages, the inventors have conceived and reduced to practice a software and/or hardware facility for identifying API endpoints and the information required to use the endpoints ("the facility"). By "crawling" the environment hosting the web services, the facility is able to identify API functions and web services available in the environment. The facility additionally allows users to search for specific functionality, or the use of certain data or information, to find specific web services, and eliminate the need to manually search through each and every function in the API to find the "best" function for the situation.

In some embodiments, the facility crawls a coding environment used by the users. In some embodiments, the facility crawls a database populated with definitions of endpoints. In some embodiments, the facility identifies projects within the coding environment. In some embodiments, the facility crawls multiple coding environments. In some embodiments, the facility crawls a repository populated with endpoints.

In some embodiments, the facility crawls the coding environment multiple times. In some embodiments, the facility crawls the coding environment according to a schedule, such as daily, weekly, monthly, hourly, etc. In some embodiments, the facility logs changes or trends in the functions of the API, such as the growth of the number of functions within a project or environment, changes to existing functions, etc. In some embodiments, where the facility determines there is a change in an existing function, the facility detects whether there is an error or anomaly in the function. In some embodiments, where the facility detects an error or anomaly in the function, the facility takes an action, such as alerting the developer of the function, alerting a person other than the developer, restoring a previous version of the function, etc. In some embodiments, the facility utilizes machine learning to detect errors or anomalies in the function.

In some embodiments, the facility organizes and logs each endpoint along with data describing the endpoint, such as the purpose of the endpoint, the data required to use the endpoint, how to access the endpoint, code configured to access the endpoint, the environment in which the endpoint is located, the project in which the endpoint is located, the number of times the endpoint is used, etc. In some embodiments, the facility gathers data regarding the number of endpoints within each environment. In some embodiments, the facility gathers data regarding the number of endpoints within each project. In some embodiments, the facility gathers data regarding the number of projects within each environment. In some embodiments, the facility identifies each page with access to an endpoint (collectively "landing pages").

In some embodiments, the facility allows a user to search for an endpoint. In some embodiments, a user searches for an endpoint based on the data necessary to use the endpoint, such as a variable required to use a web service. In some embodiments, a user searches for an endpoint based on the environment in which the endpoint is located. In some embodiments, a user searches for an endpoint based on the project in which an endpoint is located. In some embodiments, the facility utilizes machine learning to assist a user in finding an appropriate endpoint by identifying the semantic meaning of the information entered by the user.

In some embodiments, the facility displays existing endpoints at multiple different times to a user, such as displaying endpoints which existed in the past as well as endpoints which currently exist. In some embodiments, the facility identifies differences between the endpoints that existed in the past and the endpoints that currently exist, such as removals, additions, changes, etc. In such embodiments, a user is able to update their use of the endpoints as needed or adapt to prevent systems from being affected negatively in response to the identified differences.

In some embodiments, the facility allows a user to automatically invoke all discovered endpoints via known, unknown, or discoverable parameters. Parameters may be enumerated from a list of common parameters, detected, or determined via machine learning techniques. Once inferred, these parameters may be used to determine network vulnerabilities, inspect for the presence or absence of authentication mechanisms, store inputs and outputs for testing purposes, or be used to provided complete working examples for users.

By performing in some or all of the ways described above, the facility allows users to efficiently locate endpoints for existing APIs. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, the facility allows users to quickly find appropriate functions within an API, thereby preventing users from creating duplicate or redundant functions which may take up excessive storage or processing resources.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
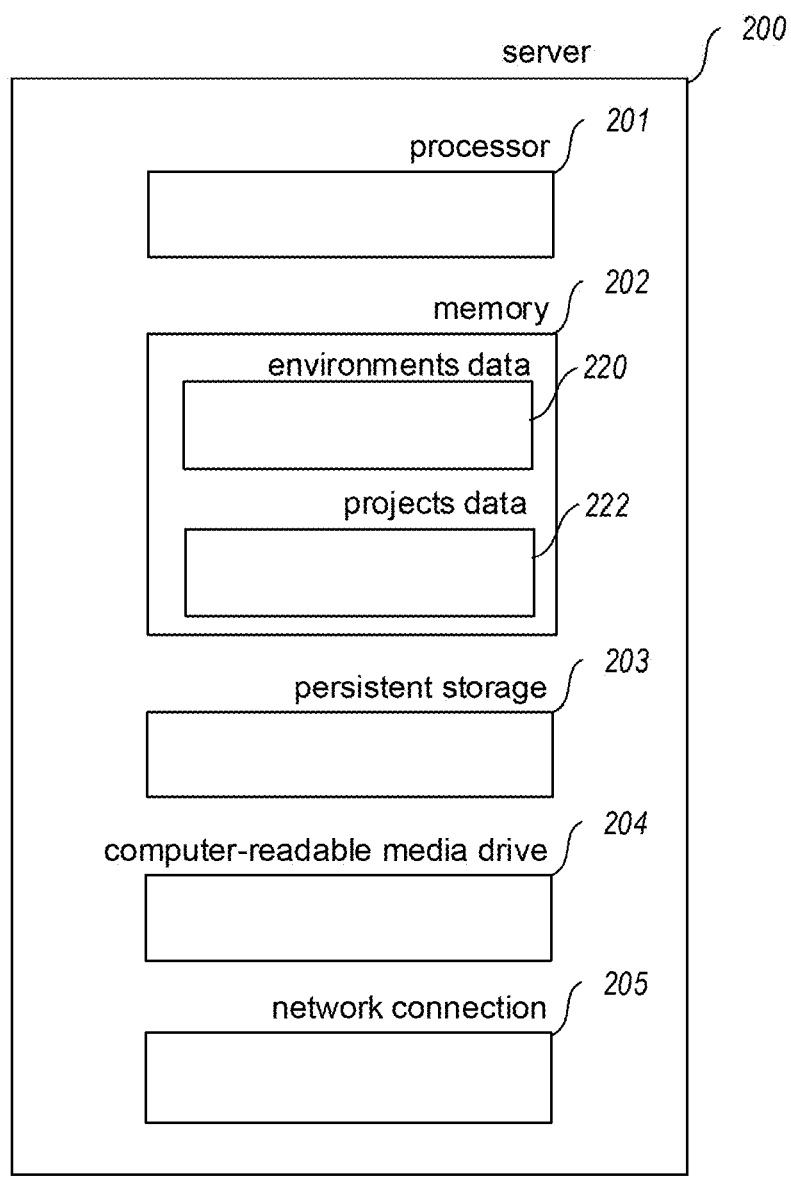
FIG. 2 is a block diagram showing some of the components typically incorporated in a server hosting endpoints used by the facility in some embodiments.

FIG. 2 is a block diagram showing some of the components typically incorporated in a server hosting endpoints used by the facility in some embodiments. In various embodiments, the server 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, server includes zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. Additionally, stored in the memory 220 is environments data 220, containing data describing one or more environments accessible to the server as well as data indicating the APIs or endpoints located within each environment, and projects data 222, containing data describing one or more projects accessible to the server as well as data indicating the APIs or endpoints associated with each project. While computer systems configured as described above are typically used to support the operation of the facility, those skilled in the art will appreciate that the facility may be implemented using devices of various types and configurations, and having various components.

Figure 3:
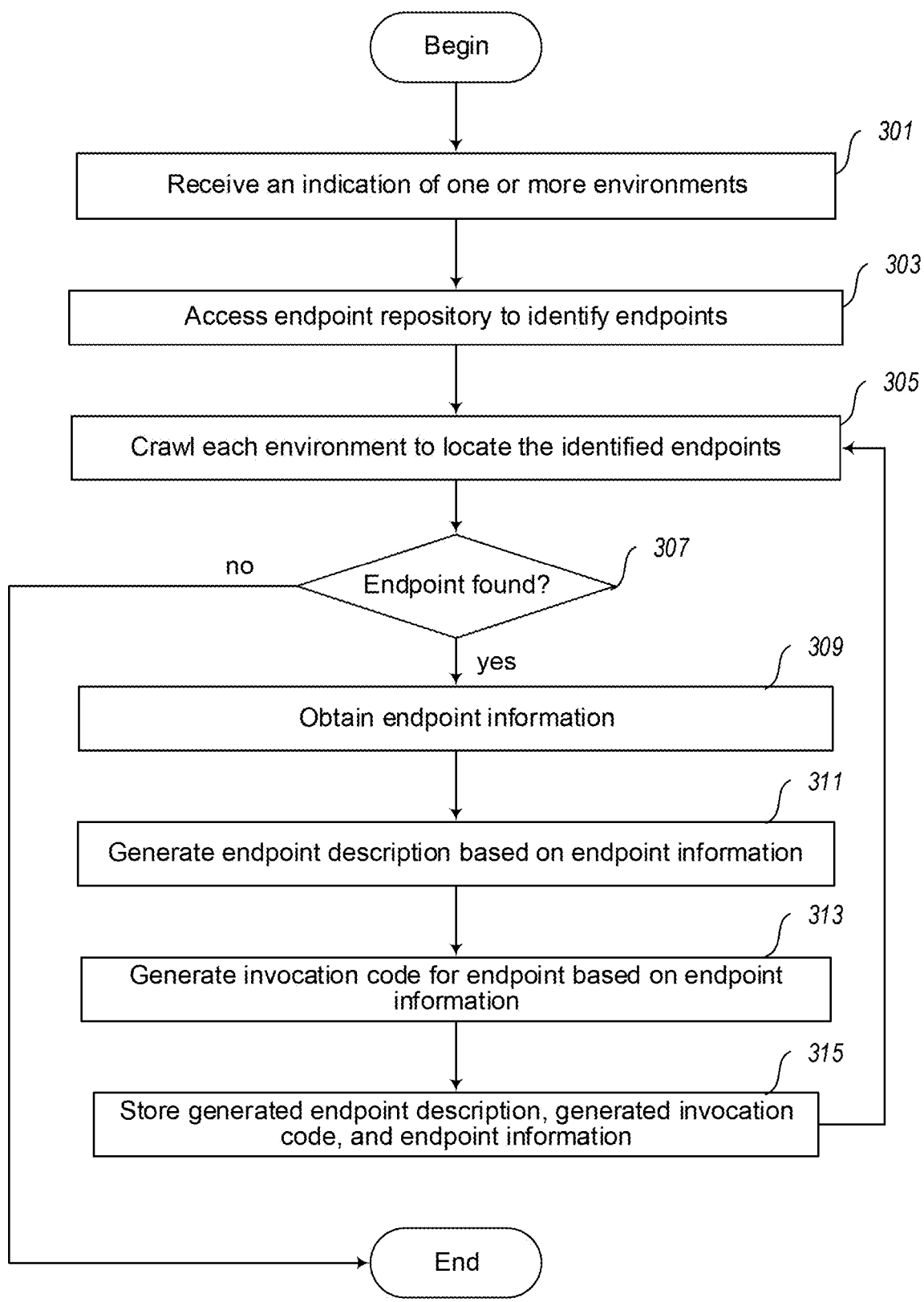
FIG. 3 is a flow diagram showing a process performed by the facility in some embodiments to identify endpoints within an environment.

FIG. 3 is a flow diagram showing a process performed by the facility in some embodiments to identify endpoints within an environment. In some embodiments, the facility performs the process to identify endpoints periodically. For example, some embodiments, the facility performs the process to identify endpoints according to a schedule, such as weekly, monthly, daily, hourly, etc. In some embodiments, the facility receives a schedule for performing the process to identify endpoints via user input. In some embodiments, the facility performs the process to identify endpoints after receiving user input indicating that the process should be performed.

The process to identify endpoints begins at act 301, where the facility receives an indication of one or more environments. In some embodiments, the facility receives the indication of one or more environments via user input. In some embodiments, the indicated environment includes one or more projects each of which contain zero or more endpoints. At act 303, the facility accesses an endpoint repository to identify endpoints. In some embodiments, the facility obtains general information describing each endpoint from the endpoint repository. In some embodiments, the endpoint repository is populated by developers as they create endpoints. In some embodiments, the endpoint repository includes a prepopulated database, or service, which includes a description of the endpoints. In some embodiments, the endpoint repository takes at least one of many forms such as a database, a text file, etc. In some embodiments, the facility populates the endpoint repository by registering new projects within the repository as the new projects are created. In some embodiments, the facility populates the endpoint repository manually via user input. In some embodiments, a project "self-registers" with the endpoint repository without any user interaction.

At act 305, the facility crawls each of the indicated environments to locate the identified endpoints within the environments. At act 307, if the facility finds and endpoint, the process continues to act 309, otherwise the process ends. At act 309, the facility obtains information describing the endpoint from the endpoint. In some embodiments, the endpoint information includes one or more of: an indication of the environment in which the endpoint is located, an indication of the project in which the endpoint is located, an indication of a landing page associated with the endpoint, an indication of the parameters used by the endpoint, an indication of the API used by the endpoint, an indication of a REST or SOAP method used by the endpoint, etc. In some embodiments, the endpoint information includes usage statistics for the endpoint. At act 311, the facility generates an endpoint description based on the endpoint information. At act 313, the facility generates invocation code for the endpoint based on the endpoint information. In some embodiments, the invocation code is generated uses the Python programming language. In some embodiments, the facility generates invocation code for a multitude of coding languages. At act 315, the facility stores the generated endpoint description, generated invocation code, and the endpoint information. After act 315, the process continues to act 305, and continues until the facility does not find an endpoint at act 307.

In some embodiments, the facility identifies changes in the endpoints between successive executions or invocations of the process. In some embodiments, the facility transmits an alert to a computing device when a change in an endpoint is detected. In some embodiments, the facility determines whether the change is an anomaly or error. In some embodiments, the facility utilizes a machine learning model trained to detect anomalies or errors in endpoints to determine if the change was an anomaly or error. In some embodiments, the facility automatically rolls back an endpoint to a previous version of the endpoint when the facility detects there is a change in the endpoint, or suggests doing so to the endpoint's developer. In some embodiments, the facility detects trends in the changes to endpoints, such as the addition or removal of endpoints in different environments or projects, the use of endpoints with certain variables, etc.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
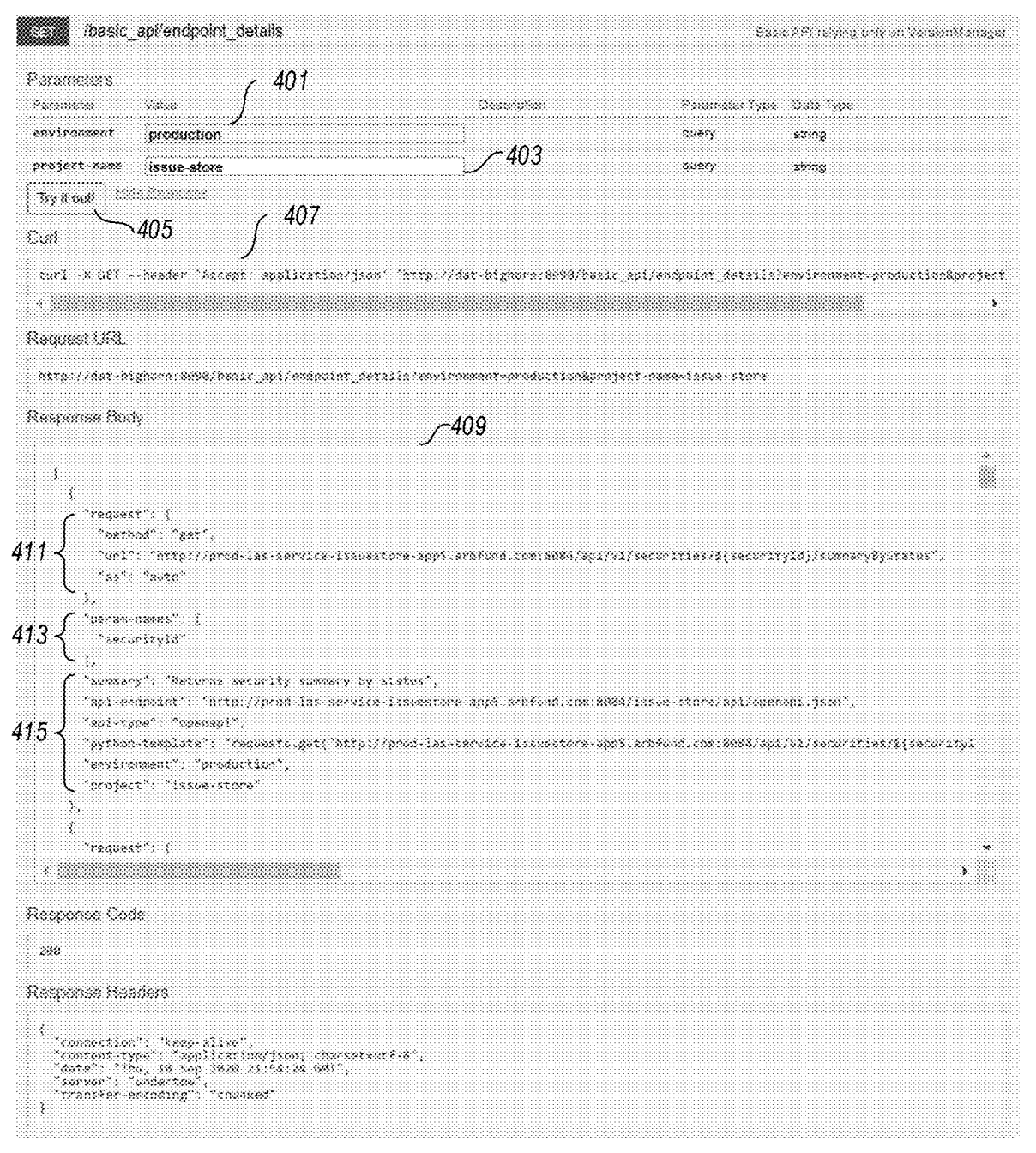

FIG. 4 is a display diagram showing an endpoint details screen presented by the facility in some embodiments. The endpoint details screen includes an environment text box 401, a project text box 403, a search button 405, a curl text box 407, and a response text box 409. The environment text box 401 obtains user input indicating an environment to search. In some embodiments, the environment text box 401 can receive user input indicating multiple environments. The project text box 403 obtains user input indicating a project to search. In some embodiments, the facility does not require a project to be specified in order to search for endpoints, and the project text box 403 is not included. In some embodiments, the project text box 403 obtains user input indicating multiple projects. Activating the search button 405 indicates to the facility that the process described in FIG. 3 should be performed using the environment indicated in environment text box 401 and the project indicated in the project text box 403.

The curl text box 407 indicates a command line command issued to the facility to indicate to the how to search for the endpoints using the process described in FIG. 3. In some embodiments, where the endpoint is implemented via a REST or SOAP API, the command includes an indication to retrieve the endpoint header. In some embodiments, the command line includes an indication of the format to display endpoint information, such as the JSON format as indicated in curl text box 407.

The response text box 409 includes a list of each endpoint located by the facility, as well as the endpoint information identified by the facility. In some embodiments, the endpoint information is displayed in JSON format. The endpoint information included in the response text box 409 includes request information 411, parameter information 413, and general information 415. The request information 411 includes information indicating the type of endpoint, such as whether the endpoint includes a GET, POST, DELETE, etc. method; information indicating a location of the endpoint, such as a URL, URI, file-path, etc.; and other information related to the type of endpoint such as an identifier for the database storing the endpoint, the parameters used in a query used by the endpoint, etc. The parameter information 413 includes information indicating the parameters used by the endpoint. The general information 415 includes general information describing the endpoint such as the generated summary of the endpoint; the API type; a landing page of the endpoint; code generated by the facility for invoking the endpoint; the environment in which the endpoint is located; etc.

FIG. 5 is a table diagram representing an endpoint data structure used by the facility in some embodiments. The table diagram representing an endpoint data structure includes an endpoint id column 510, a description column 511, an environment column 512, a project column 513, a landing page column 514, a variable column 515, a REST method column 516, and an invocation code column 517. The endpoint id column 510 includes information indicating an identifier for an endpoint. The description column 511 includes information indicating the description of an endpoint. In some embodiments, the facility generates this description based on the information describing the endpoint such as the endpoint variables, methods, etc. For example, in row 501 the endpoint description column contains "Returns security summary," the variables column 515 includes the "securityID" variable, and the REST method column 516 includes a "Get" method. The facility uses this information to infer that the endpoint is used to obtain information regarding a security based on the securityID.

The environment column 512 includes information indicating the environment that the endpoint is stored in. The project column 513 includes information indicating the project the endpoint is stored in. The landing page column 514 includes information indicating the landing page which uses the endpoint. The variables column 515 includes information indicating the variables required to operate the endpoint. The REST methods column 516 includes information specifying the rest methods used by the endpoint. The invocation code column 517 includes code used to invoke the endpoint within an application. In some embodiments, the endpoint data structure includes additional data related to the endpoint, such as query parameters used by the endpoint, a database in which the endpoint is located, the type of API used by the endpoint, the host of the endpoint, etc.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

Figure 6:
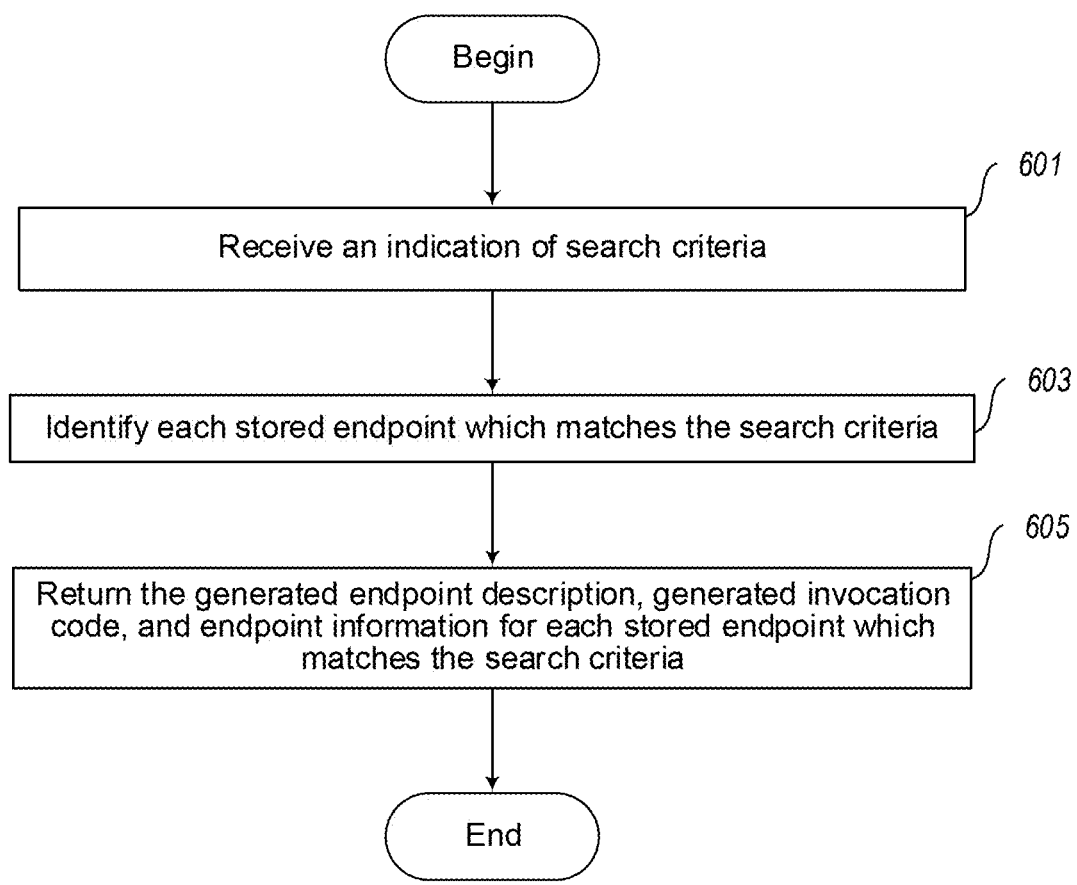
FIG. 6 is a flow diagram showing a process used by the facility in some embodiments to search for an endpoint.

FIG. 6 is a flow diagram showing a process used by the facility in some embodiments to search for an endpoint. At act 601, the facility receives an indication of search criteria. In some embodiments, the facility receives the indication of search criteria via user input. In some embodiments, the user input is obtained via a query interface, similar to the interface described in FIG. 7.

FIG. 7 is a display diagram showing a sample query interface used by the facility in some embodiments. The query interface includes an environment text box 701, a projects text box 703, a parameters text box 705, a get drop down 707, a post drop down 709, a put drop down 711, and a search button 713. The environment text box 701 operates in a similar manner to the environment text box 401. The project text box 703 operates in a similar manner to the project text box 403. The parameters text box 705 facilitates receiving user input indicating one or more parameters. The get drop down 707, post drop down 709, and put drop down 711 allow a user to specify whether the function should include endpoints which use those REST functions. For example, when "true" is selected for the get drop down 707, the facility will search for endpoints which use the "get" function. When "false" is selected for the get drop down 707, the facility will ignore endpoints which use the "get" function. When the search button 713 is activated, the facility obtains the information contained in the various text boxes and drop downs in the query interface and uses that information as the search criteria.

Returning to FIG. 6, at act 603, the facility identifies each stored endpoint which matches the search criteria obtained in act 601. At act 605, the facility returns the generated endpoint description, invocation code, and endpoint information for each stored endpoint which matches the search criteria. In some embodiments, the facility returns this information in a JSON format.

FIG. 8 is a display diagram showing sample search query output produced by the facility in some embodiments. In the response body of the search query, the endpoint information is organized by the description information 801, invocation information 803, parameter information 805, and general information 807. The description information 801 includes information similar to the request information 411. The invocation information 803 includes information indicating code used to invoke the endpoint. The parameter information 805 includes information similar to the parameter information 413. The general information 807 includes information similar to the general information 415.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for identifying endpoints within an environment, the system comprising:
   a repository configured to store an indication of one or more endpoints;
   a computing device configured to:
   store an environment supporting the development of software, the environment hosting one or more endpoints;
   receive the indication of one or more endpoints from the repository;
   identify one or more endpoints within the environment based on the indication of one or more endpoints;
   generate a list of endpoints based on the identified one or more endpoints; and
   display the list of endpoints.

2. The system of claim 1, further comprising:
   the computing device being further configured to:
   store additional environments, the additional environments hosting one or more additional endpoints;
   receive the indication of one or more endpoints from the repository;
   identify one or more additional endpoints within each of the additional environments based on the indication of one or more endpoints; and
   for each endpoint of the one or more additional endpoints:
   store an indication of an environment which contains the endpoint.

3. The system of claim 1, wherein the computing device is further configured to generate a description of each of the one or more endpoints.

4. The system of claim 1, wherein the computing device is further configured to generate code used to invoke each of the one or more endpoints.

5. The system of claim 1, wherein the computing device is further configured to:
   identify one or more variables used by each of the one or more endpoints; and
   for each endpoint of the one or more endpoints:
   store an indication of the one or more variables used by the endpoint.

6. The system of claim 5, wherein the computing device is further configured to:
   receive user input identifying one or more variables; and generate a list of endpoints based on the user input identifying one or more variables, wherein the list of endpoints includes endpoints which use the one or more variables.

7. The system of claim 1, further comprising:
the environment further includes one or more landing pages, each of the one or more landing pages further including one or more endpoints; and
the computing device being further configured to:
for each landing page of the one or more landing pages:
identify the endpoints included in the landing page.

8. The system of claim 1, wherein the computing device is further configured to:
receive a second indication of one or more endpoints from the repository after a predetermined period of time, the predetermined period of time being based on a schedule;
identify one or more additional endpoints within the environment based on the second indication of one or more endpoints for each landing page of the one or more landing pages;
generate a second list of endpoints based on the identified one or more endpoints and the identified one or more additional endpoints; and
display the second list of endpoints.

9. The system of claim 8, wherein the computing device is further configured to:
identify a trend in the environment based on the indicated one or more endpoints and the second indicated one or more endpoints.

10. The system of claim 9, wherein the computing device is further configured to:
for each endpoint of the second list of endpoints:
determine whether the endpoint has changed based on the list of endpoints and the second list of endpoints.

11. The system of claim 9, wherein the computing device is further configured to:
for each endpoint of the second list of endpoints:
determine whether there is an error in the endpoint based on the determination that the endpoint has changed; and
alert a user that there is an error in the endpoint based on the determination that there is an error in the endpoint.

12. One or more non-transitory instances of computer-readable media collectively having contents configured to cause a computing device to perform a method for identifying endpoints within an environment supporting the development of software, the method comprising:
storing, by a repository, an indication of one or more endpoints;
storing, by a computing device, the environment supporting the development of software, the environment hosting one or more endpoints;
receiving, by the computing device, the indication of one or more endpoints from the repository;
identifying, by the computing device, one or more endpoints within the environment based on the indication of one or more endpoints;
generating, by the computing device, a list of endpoints based on the identified one or more endpoints; and
displaying, by the computing device, the list of endpoints.

13. The one or more instances of computer-readable media of claim 12, the method further comprising:
storing, by the computing device, additional environments, the additional environments hosting one or more additional endpoints;
receiving, by the computing device, the indication of one or more endpoints from the repository;
identifying, by the computing device, one or more additional endpoints within each of the additional environments based on the indication of one or more endpoints; and
for each endpoint of the one or more additional endpoints:
storing, by the computing device, an indication of an environment which contains the endpoint.

14. The one or more instances of computer-readable media of claim 12, wherein the method further comprises generating, by the computing device, a description of each of the one or more endpoints.

15. The one or more instances of computer-readable media of claim 12, wherein the method further comprises generating, by the computing device, code used to invoke each of the one or more endpoints.

16. The one or more instances of computer-readable media of claim 12, wherein the method further comprises:
identifying, by the computing device, one or more variables used by each of the one or more endpoints; and
for each endpoint of the one or more endpoints:
storing, by the computing device, an indication of the one or more variables used by the endpoint.

17. The one or more instances of computer-readable media of claim 16, wherein the method further comprises to:
receiving, by the computing device, user input identifying one or more variables; and
generating, by the computing device, a list of endpoints based on the user input identifying one or more variables, wherein the list of endpoints includes endpoints which use the one or more variables.

18. The one or more instances of computer-readable media of claim 12, wherein the environment includes one or more landing pages each including one or more endpoints, the method further comprising:
for each of the one or more landing pages included in the environments:
identifying, by the computing device, the endpoints included in the landing page.

19. The one or more instances of computer-readable media of claim 12, further comprising:
receiving, by the computing device, a second indication of one or more endpoints from the repository after a predetermined period of time, the predetermined period of time being based on a schedule;
identifying, by the computing device, one or more additional endpoints within the environment based on the second indication of one or more endpoints for each landing page of the one or more landing pages;
generating, by the computing device, a second list of endpoints based on the identified one or more endpoints and the identified one or more additional endpoints; and
displaying, by the computing device, the second list of endpoints.

20. The one or more instances of computer-readable media of claim 19, further comprising:
identifying, by the computing device, a trend in the environment based on the indicated one or more endpoints and the second indicated one or more endpoints.

21. The one or more instances of computer-readable media of claim 20, further comprising:
for each endpoint of the second list of endpoints:
determining, by the computing device, whether the endpoint has changed based on the list of endpoints and the second list of endpoints.

22. The one or more instances of computer-readable media of claim 20, further comprising:

for each endpoint of the second list of endpoints:
determining, by the computing device, whether there is an error in the endpoint based on the determination that the endpoint has changed; and
alerting, by the computing device, a user that there is an error in the endpoint based on the determination that there is an error in the endpoint.

23. One or more non-transitory storage devices collectively storing an endpoint data structure for use by a computing device to identify endpoints within an environment supporting the development of software, the endpoint data structure comprising:

information specifying a repository configured to store an indication of one or more endpoints;

information specifying an environment supporting the development of software, the environment hosting one or more endpoints; and a list of endpoints, such that the information specifying the repository is usable to receive an indication of one or more endpoints from the repository, the indication of one or more endpoints from the repository being usable to identify one or more endpoints within the environment, and the list of endpoints is able to be populated with at least one endpoint based on the identified one or more endpoints.

24. The one or more storage devices of claim 23, the endpoint data structure further comprising:

information specifying additional environments, the additional environments hosting one or more additional endpoints; and information specifying a list of environments within which an endpoint is hosted, such that, the indication of one or more endpoints is usable to identify one or more additional endpoints within each of the additional environments, and the list of environments within which an endpoint is hosted is populated based on the identified one or more additional endpoints.

* * * * *